Sept. 3, 1940.   D. A. MEEKER   2,213,606
COFFEE MILL
Original Filed Aug. 26, 1936   2 Sheets-Sheet 1

INVENTOR
David A. Meeker
BY Marechal & Noe
ATTORNEYS

Sept. 3, 1940.  D. A. MEEKER  2,213,606
COFFEE MILL
Original Filed Aug. 26, 1936   2 Sheets-Sheet 2

INVENTOR
David A Meeker
BY Marechal & Noe
ATTORNEYS

Patented Sept. 3, 1940

2,213,606

UNITED STATES PATENT OFFICE 2,213,606

COFFEE MILL

David A. Meeker, Troy, Ohio, assignor to The Hobart Manufacturing Company, Troy, Ohio, a corporation of Ohio Original application August 26, 1936, Serial No. 97,972. Divided and this application September 7, 1939, Serial No. 293,858

6 Claims. (Cl. 83—18)

This invention relates to food handling apparatus and more particularly to coffee mills.

It is a principal object of the invention to provide a coffee mill adjustable to a plurality of grades of fineness of grind and which affords direct visual indication to the customer of the setting of the mill.

It is a further object to provide in a mill of this character an indicating device which is simple and efficient in construction and which provides a prominent visual indication to the customer.

It is also an object to provide in such a coffee mill as indicator having markings therein corresponding to the several grades of fineness, the markings being selectively illuminated to provide the desired visual indication to the customer in accordance with the setting of the mill.

Other objects and advantages will be apparent from the description, the accompanying drawings and the appended claims.

In the drawings—

Figure 2:
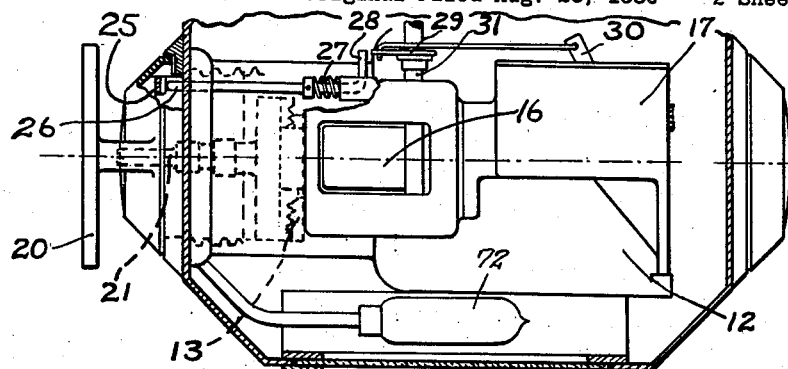
Fig. 2 is a plan view of the mill with the upper portions of the casing removed to show the construction of the mill.
Figure 1:
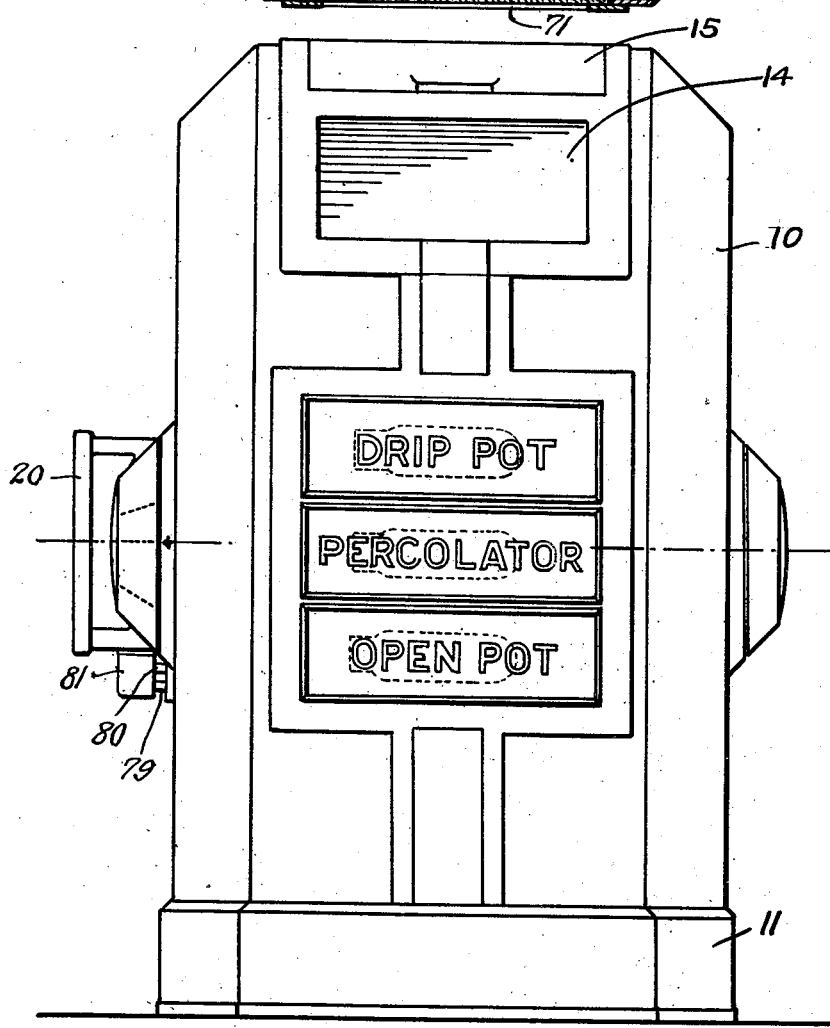
Fig. 1 is a view in side elevation of a coffee mill constructed in accordance with the present invention.

This application is a division of copending application Serial No. 97,972 filed August 26, 1936, and assigned to the same assignee as this application.

Referring to the drawings which disclose a preferred embodiment of the invention, the coffee mill comprises a main housing 10 comprising enclosing wall portions mounted upon a base structure 11. The mill is provided with motive power means 12 such as an electric driving motor, and grinding burrs 13 operatively driven thereby. At the top of the mill is a hopper 14 for receiving the coffee to be ground, which may be closed by a pivoted cover 15. A gate member 16 at the lower end of the hopper controls the supply of coffee from the hopper into the grinding burrs, and the motor switch 17 controls the operation of the motor.

Figure 3:
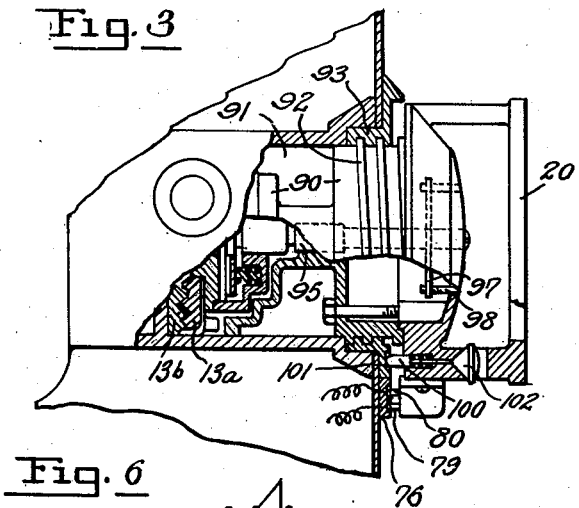
Fig. 3 is a broken side elevational view partially in section on an enlarged scale of the grade selector and indicator mechanism.
Figure 5:
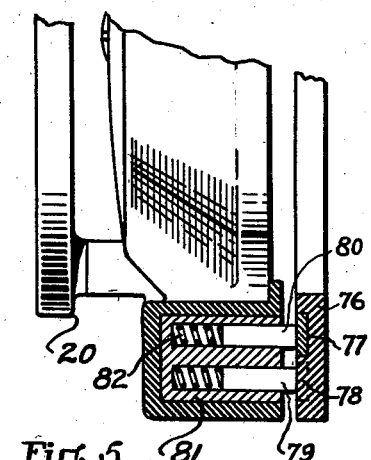
Fig. 5 is a fragmentary vertical sectional view showing a detail of the construction of Fig. 3.

Positioned at one end of the mill is the grade selector means 20. This preferably comprises a ring shaped portion adapted to be rotatably operated by the clerk or user of the mill, to provide for adjusting and predetermining the grade of fineness of grind. The grade selector member is mounted on a threaded part of the mill and in response to rotation, the grade selector member moves inwardly or outwardly, causing the shaft 21 to move axially, to thereby effect control of the spacing of burrs 13. Preferably the grade selector means comprises a structure such as shown in applicant's copending application, now Patent No. 2,090,634 issued August 24, 1937. As shown in said patent and in Fig. 3 herein, the grade selector means 20 is provided with a guide member 90 which receives the rotatable and axially adjustable burr 13a, the fixed nonrotating burr 13b being located in fixed position within the burr chamber 91. The guide member is also provided with an external spiral thread 92 adapted to fit within a cooperating spiral groove formed in ring 93 fixed to the burr casing by means of screws 94.

The grade selector and the guide member also carry an adjusting arm 95 provided with an end engaging portion 96 adapted to engage the end of the rotary burr 13a to adjust the same axially to thereby control the degree of fineness of the grind. Member 95 is threaded into grade selector 20 to provide for zero adjustment thereof, and a locking means comprising a bar 97 threaded upon member 95 and adapted to be placed under tension by means of a pair of screws 98 serves to maintain the member 95 in any predetermined adjusted position.

As will be evident upon rotation of the grade selector member, the guide member 90 and adjusting arm 95 will be caused to move axially to vary the spacing of burrs 13a, 13b, and thereby to adjust to vary the grade selected. A latch mechanism is also preferably provided to retain the grade selector means in any predetermined adjusted position, this means comprising a spring pressed plunger 100 carried in the grade selector 20, and adapted to seat in any one of a plurality of depressions 101 is formed in ring 93. An operating knob 102 extends to the outer face of the grade selector. The construction is preferably such that the grade selector may be moved to any predetermined grade position by means of the grade selector handle, the plunger snapping into the several depressions to hold the selector in any desired position.

In accordance with the present invention the grade selector is so constructed that it can be completely removed from the burr casing as a unit in a very simple manner. Stop means (not shown) are preferably provided to limit the normal movement of the grade selector handle to the off position, but are so arranged that the knob 102 may be manually withdrawn to clear the stop member and to permit unscrewing of the grade selector means for complete removal thereof from the mill.

If desired an interlock mechanism may be provided for requiring the return of the grade selector from the setting it occupied for a previous grind to its neutral position or the resetting of the grade selector to a new grinding position, before the machine can be operated for a succeeding grind. For this purpose, a cam 25 is located upon the inner portion of the grade selector handle, which is adapted to cooperate with an axially movable shaft 26 mounted for sliding axial movement. Spring means 27 tends normally to urge the shaft toward the cam and to maintain engagement therebetween. The shaft may be provided with interlock fingers 28 adapted to cooperate with links 29 connected to the motor switch operating member 30 and to the shaft 31 of the pivoted gate 16 to provide for interlocking action thereof. This shaft preferably extends to the exterior of the mill casing where an operating handle (not shown) is provided in convenient position for the clerk or operator. Operation of such handle to one position effects opening of the gate from the hopper to supply the material to the grinding burrs, and the closing of the motor switch; the reverse takes place upon opposite movement thereof. The purpose of interlock mechanism of this character is to assure that the clerk, at each operation of the mill, will be required to adjust the grade selector to a predetermined setting; the interlock structure prevents the turning on of the motor switch, or the opening of the gate to feed coffee from the hopper, or both, unless the grade selector has been turned or adjusted from its neutral or off position to one of its several grinding positions. The clerk being thus required to effect adjustment of the grade selector at each operation of the mill is more likely to ascertain the wishes of the individual customer, and to adjust the grade selector accordingly. A suitable mechanism for this purpose is that shown in said Patent No. 2,090,634, the details thereof not being shown in this application.

In accordance with the present invention novel and highly effective means are provided for affording visual indication to the customer of the setting of the mill. Thus where an interlock mechanism such as above described is employed, the clerk is required to effect the setting of the mill to one of its several grinding positions. And means are provided which are operated in accordance with the setting of the grinding means for affording direct and easily visible indication to the customer, so that he will know the setting of the mill and whether it is set to produce ground coffee of the character desired.

In accordance with this construction means are provided for selectively illuminating a predetermined legend marking means. Thus the face of the mill 70 is provided with a series of translucent plates 71 bearing markings or legends thereon showing the fineness of grind and of different light responsive properties than the plates. As shown, the markings may comprise the words "Drip pot", "Percolator", and "Open pot" corresponding to the several grades of fineness of grind as required in properly making coffee by the several methods. The plates are located in predetermined arrangement, each being provided with a light source 72 in light transmitting relation thereto. Each legend is enclosed with its own light source and is protected against illumination from any light source except the one directly associated therewith, so that upon energizing any of the light sources 72 only that legend directly associated therewith will be caused to be illuminated.

Figure 6:
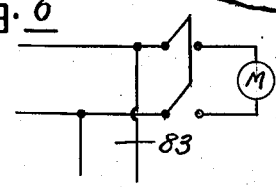
Fig. 6 is a partial schematic diagram showing a modified circuit control arrangement.
Figure 4:
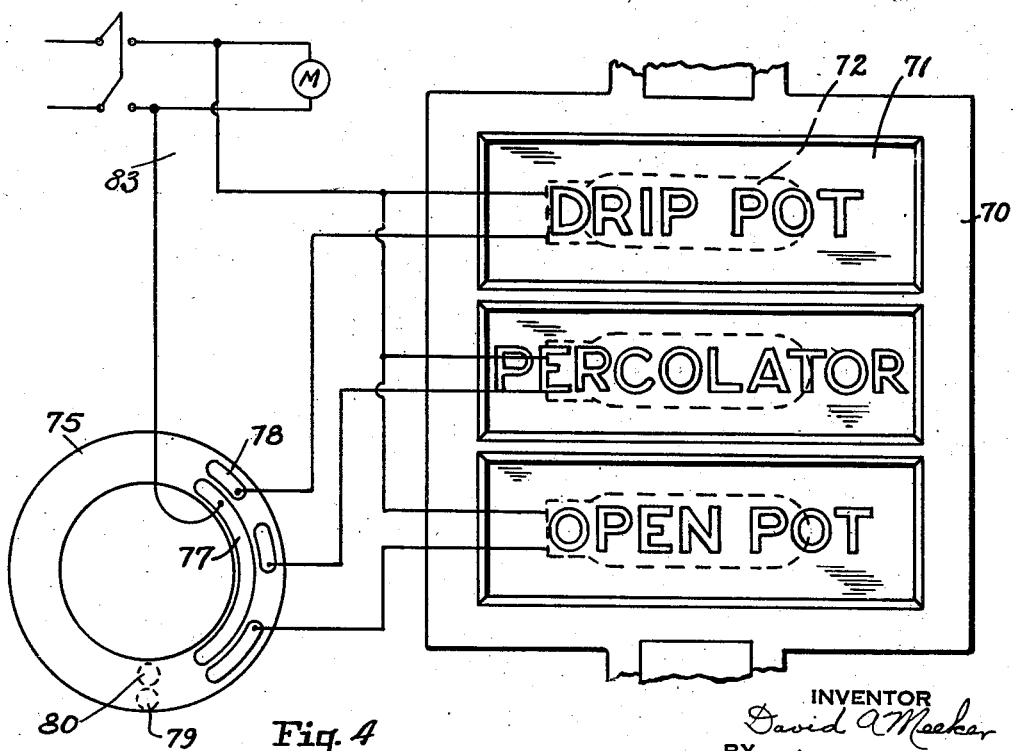
Fig. 4 is a view partially schematic and partially in side elevation showing the construction of the indicating means.

Means are provided for causing selective illumination of the appropriate marking in accordance with the setting of the grade selector means. This comprises switch means 75 which is arranged to be operated in accordance with the position of the grade selector member 20 by suitable switch control means carried by the member 20 and located outwardly from the axis thereof. For this purpose an insulating ring 76, which may be an integral part of the mill casing, carries an inner continuous contact 77, and an outer series of contacts 78, insulated from each other, and separately connected each to one terminal of the several light sources 72. The two sets of contacts 77 and 78 are located in corresponding positions adjacent each other, and are adapted to be engaged by a pair of contact brushes 79, 80, which are housed within an insulating contact assembly 81 carried by and movable with the adjustable grade selector means 20. Spring means 82 urges each of the contact members into engagement with the fixed contacts 77 and 78. Thus in response to the turning of the grade selector member 20 to the several positions of adjustment thereof, the contact assembly 75 provides for establishing contact from the ring 77 to that one of contacts 78 corresponding to the setting of the mill. Suitable connections from a power source 83, as shown in Fig. 4, provide for the corresponding illumination of the associated light source 72 which effects the illumination of the proper sign to indicate clearly to the customer the setting of the mill. When the grade selector is turned to the neutral or non-grind position the contact pins 79, 80 move beyond the range of the fixed contacts, into a position such as that illustrated in dotted lines in Fig. 4. In such position of adjustment none of the light sources is energized and all the markings remain unilluminated. The construction is thus such that the switch control means carried by the removable grade selector member is entirely self-contained therewith making it possible to remove the grade selector assembly to provide access to the burr chamber and the burrs without disturbing the operative setting or adjustment of the parts, the replacement of the grade selector assembly immediately placing the mill in properly adjusted operative condition, and providing for establishing the proper selective illuminating circuits without necessity for any additional connection or disconnection of parts or wiring. The entire circuit may further be controlled in accordance with the motor switch as shown in Fig. 4, being energized only when the circuit to the motor is closed and the motor running. Alternatively the illuminating means may be operated independently of the motor switch, as shown in Fig. 6, so that the settings of the mill may be illuminated and indicated prior to the actual grinding operation.

In operation, in a device of this character the coffee to be ground is first placed within the hopper 14, and the lid 15 thereafter closed. The clerk having ascertained the customer's wishes in accordance with the method of making coffee utilized by such customer, effects adjustment of the grade selector 20 to the desired positioning to give the necessary fineness of grind. Preferably the bevelled face of the grade selector is provided with indications, cooperating with a fixed index point, readable from the rear or clerk's side of the mill so that his reading and adjustment will correspond with that indicated upon the customer's side. Having adjusted the mill to the desired setting, the corresponding marking 71 is illuminated and the operation of the mill may be started by turning on the motor and opening the control gate, the coffee being ground to the indicated grade of fineness. Simultaneously with the energizing of the mill, the marking is clearly illuminated so that the customer is advised of the setting of the mill and if the clerk has failed to properly adjust the mill can promptly call attention to the fact. At the end of the grinding operation, the interlock action, where desired, again becomes effective to prevent subsequent operation of the mill until the grade selector has been returned to its off position, and again set to a predetermined grade of grind. It will be understood that the indicating device may be used with or without the interlock features as described.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A coffee mill of the character described which comprises an enclosing casing, a burr chamber in said casing, grinding means in said burr chamber, manually operable grade selector means removably supported from said casing and adjustable thereon over a series of operative positions of varying grades of fineness, said grade selector means being removable from said casing to provide access to said burr chamber, means for effecting adjustment of said grinding means upon adjustment of said grade selector means, indicator means for indicating to the customer the setting of said grade selector means including a plurality of legends representative of the fineness of grind, a light source associated with each said legend, switch control means carried on said grade selector member and removable and rotatable therewith, and cooperating switch means on said casing in position to be operated selectively by said switch control means in each of the grinding positions of said grade selector means to cause illumination of the light source associated with the legend corresponding to the setting of the grade selector means, said switch control means being freely removable and replaceable in operative position with said grade selector means.

2. A coffee mill of the character described which comprises an enclosing casing, grinding means in said casing, manually operable grade selector means rotatably supported from said casing and adjustable over a series of operative positions of varying grades of fineness, means operable upon rotary adjustment of said grade selector means for effecting adjustment of said grinding means to grind to varying grades of fineness, indicator means for indicating to the customer the setting of said grade selector means including a plurality of legends representative of the fineness of grind, a light source associated with each said legend, switch control means carried on said grade selector member at a predetermined radial distance from the axis thereof and rotatable therewith, and cooperating switch means supported from said casing in position to be operated selectively by said switch control means in each of the grinding positions of said grade selector means to cause illumination of the light source associated with the legend corresponding to the setting of the grade selector means.

3. A coffee mill of the character described which comprises an enclosing casing, grinding means in said casing including an axially adjustable grinding burr, manually operable grade selector means removably supported from said casing and adjustable over a series of operative positions of varying grades of fineness, said grade selector means being removable from said casing to provide access to said grinding burrs, means for effecting adjustment of said axially movable burr upon adjustment of said grade selector means, indicator means for indicating to the customer the setting of said grade selector means including a plurality of legends representative of the fineness of grind, a light source associated with each said legend, switch control means carried by said grade selector member and removable and rotatable therewith, and cooperating switch means supported from said casing in position to be operated selectively by said switch control means in each of the grinding positions of said grade selector means to cause illumination of the light source associated with the legend corresponding to the setting of the grade selector means, said switch control means being freely removable and replaceable in operative position with said grade selector means.

4. A coffee mill of the character described which comprises an enclosing casing, a burr chamber within said casing, grinding means in said burr chamber, manually operable grade selector means removably supported in position at the end of said burr chamber and adjustable over a series of operative positions of varying grades of fineness, means for effecting adjustment of said grinding burrs upon adjustment of said grade selector means, indicator means for indicating to the customer the setting of said grade selector means including a plurality of legends representative of the fineness of grind, a light source associated with each said legend, switch control means carried by said grade selector member and removable therewith, and cooperating switch means on said casing in position to be operated selectively by said control means in each of the grinding positions of said grade selector means to cause illumination of the light source associated with the legend corresponding to the grade selector means, said switch control means being freely removable and replaceable in operative position with said grade selector means.

5. A coffee mill of the character described which comprises an enclosing casing, grinding means in said casing, manually operable grade selector means rotatably supported from said casing and adjustable over a series of operative positions of varying grades of fineness, means for effecting adjustment of said grinding means upon rotary movement of said grade selector means, indicator means for indicating to the customer the setting of said grade selector means including a plurality of legends representative of the fineness of grind, a light source associated with each said legend, a series of switch means supported on said casing in an arcuate manner about the axis of said grade selector member, and switch control means carried on said grade selector member and located outwardly from the axis thereof a predetermined distance to cause selective operation of the several switch means to thereby control the illumination of the light source associated with the legend corresponding to the setting of the grade selector means.

6. A coffee mill of the character described which comprises an enclosing casing, a burr chamber within said casing, grinding means in said burr chamber, manually operable grade selector means removably and rotatably supported from said casing adjacent the end of said burr chamber and adjustable over a series of operative positions of varying grades of fineness, said grade selector means being removable from said burr chamber as a unit to provide access thereto, means for effecting adjustment of said grinding means upon rotary movement of said grade selector means, indicator means for indicating to the customer the setting of said grade selector means including a plurality of legends representative of the fineness of grind, a light source associated with each said legend, a series of switch means supported on said casing in an arcuate manner about the axis of said grade selector member, and switch control means carried on said grade selector member and located outwardly from the axis thereof a predetermined distance to cause selective operation of the several switch means to thereby control the illumination of the light source associated with the legend corresponding to the setting of the grade selector means, said switch control means being freely removable with said grade selector means and replaceable in operative position with respect to said switch means.

DAVID A. MEEKER.